United States Patent

Hung

(10) Patent No.: US 12,502,251 B2
(45) Date of Patent: Dec. 23, 2025

(54) DENTAL VIBRATION DEVICE

(71) Applicant: Cheng-Hsiang Hung, New Taipei (TW)

(72) Inventor: Cheng-Hsiang Hung, New Taipei (TW)

(*) Notice: Subject to any disclaimer, the term of this patent is extended or adjusted under 35 U.S.C. 154(b) by 111 days.

(21) Appl. No.: 18/647,075

(22) Filed: Apr. 26, 2024

(65) Prior Publication Data

US 2024/0366341 A1 Nov. 7, 2024

Related U.S. Application Data

(60) Provisional application No. 63/467,855, filed on May 19, 2023, provisional application No. 63/464,141, filed on May 4, 2023.

(51) Int. Cl.
A61C 7/00 (2006.01)

(52) U.S. Cl.
CPC .................. A61C 7/008 (2013.01)

(58) Field of Classification Search
CPC ............. A61C 7/36; A61C 7/008; A61C 7/08
USPC ........................................................ 433/19
See application file for complete search history.

(56) References Cited

U.S. PATENT DOCUMENTS

| 4,348,178 | A | * | 9/1982 | Kurz | A61C 7/008 |
| | | | | | 433/5 |
| 5,967,784 | A | * | 10/1999 | Powers | A61C 7/008 |
| | | | | | 601/72 |
| 8,851,887 | B1 | * | 10/2014 | Ostreicher | A61C 19/06 |
| | | | | | 433/229 |
| 9,662,183 | B2 | * | 5/2017 | Lowe | A61C 7/006 |
| 9,907,626 | B1 | * | 3/2018 | Lowe | A61C 7/008 |
| 2009/0061379 | A1 | * | 3/2009 | Yamamoto | A61C 7/00 |
| | | | | | 433/18 |
| 2011/0136070 | A1 | * | 6/2011 | Rubin | A61C 7/008 |
| | | | | | 433/2 |
| 2012/0040300 | A1 | * | 2/2012 | Levens | A61C 7/00 |
| | | | | | 433/77 |

(Continued)

FOREIGN PATENT DOCUMENTS

| CN | 105748164 | A | * | 7/2016 | ............. | A61C 7/008 |
| CN | 105748164 | B | | 4/2019 | | |

(Continued)

OTHER PUBLICATIONS

Japanese language office action dated Mar. 11, 2025, issued in application No. JP 2024-074605 (English language counterpart included, pp. 6-10 of attachment).

(Continued)

*Primary Examiner* — Matthew M Nelson
(74) *Attorney, Agent, or Firm* — McClure, Qualey & Rodack, LLP

(57) ABSTRACT

A dental vibration device is provided. The dental vibration device includes a controller, a mouthpiece, and a plurality of transmission elements. The transmission elements include a central transmission element, a left transmission element, and a right transmission element. The controller is housed in a casing. Each transmission element is coupled to a vibration motor. Each transmission element extends from the casing and is inserted into the mouthpiece. The mouthpiece is composed of an anterior teeth part, a left posterior teeth part, and a right posterior teeth part spaced apart from each other.

20 Claims, 10 Drawing Sheets

(56) References Cited

U.S. PATENT DOCUMENTS

| | | | |
|---|---|---|---|
| 2013/0252193 A1* | 9/2013 | Bowman | A61C 7/08 433/24 |
| 2014/0023983 A1* | 1/2014 | Lowe | A61C 7/008 433/2 |
| 2014/0272761 A1* | 9/2014 | Lowe | A61C 17/3481 433/2 |
| 2015/0125801 A1* | 5/2015 | Bowman | A61C 7/008 433/2 |
| 2015/0173856 A1* | 6/2015 | Lowe | A61C 7/00 433/2 |
| 2016/0184054 A1* | 6/2016 | Lowe | A61C 7/008 433/24 |
| 2016/0361140 A1* | 12/2016 | Lowe | A61C 7/002 |
| 2017/0304024 A1* | 10/2017 | Nóbrega | A61C 7/002 |
| 2019/0021816 A1* | 1/2019 | Furtenhofer | A61C 7/36 |
| 2020/0093574 A1* | 3/2020 | Way | A61C 7/08 |
| 2020/0093575 A1* | 3/2020 | Way | A61C 7/008 |
| 2020/0315745 A1* | 10/2020 | Way | A61C 19/02 |
| 2020/0375697 A1* | 12/2020 | Hung | A61C 7/008 |
| 2021/0353956 A1* | 11/2021 | Scurtescu | A61N 5/0624 |
| 2022/0054243 A1* | 2/2022 | Beckman | A46B 15/0006 |
| 2022/0160484 A1* | 5/2022 | Kim | A61C 17/224 |
| 2022/0378350 A1* | 12/2022 | Hung | A61C 19/04 |
| 2023/0137136 A1* | 5/2023 | Johnson | A61C 19/06 433/215 |
| 2023/0165661 A1* | 6/2023 | Chen | A61C 7/008 433/18 |
| 2023/0240802 A1* | 8/2023 | Johnson | A61C 7/08 433/24 |
| 2024/0293212 A1* | 9/2024 | Wolfer | A61C 17/225 |

FOREIGN PATENT DOCUMENTS

| | | |
|---|---|---|
| JP | 2015229089 A | 12/2015 |
| JP | 2022181203 A | 12/2022 |

OTHER PUBLICATIONS

Office action dated Mar. 24, 2025, issued in application No. PH 1-2024-050224.

Extended European Search Report dated Aug. 20, 2024, issued in application No. EP 24174020.8.

\* cited by examiner

DENTAL VIBRATION DEVICE

CROSS REFERENCE TO RELATED APPLICATIONS

The present application claims priority to U.S. Provisional Patent Application No. 63/464,141, filed May 4, 2023, and U.S. Provisional Patent Application No. 63/467,855, filed May 19, 2023, which are incorporated by reference herein in their entirety.

BACKGROUND OF THE INVENTION

Field of the Invention

The application relates in general to a dental vibration device, and in particular, to a dental vibration device for generating occlusal loading on the teeth and periodontal tissue based on simulated human ingestion actions.

Description of the Related Art

U.S. Patent Application US 2022/0378350 A1 discloses a dental vibration device composed of a controller housed in a casing, three separate vibration transmission elements, each extending from the controller casing and coupled to a vibration motor, and a mouthpiece into which the three vibration transmission elements are inserted. The mouthpiece is adapted to fit in the space between the patient's upper and lower dental arches, and it conforms to the shape of the dental arch. However, current dental vibration devices still have several issues that need to be improved upon.

For example, the first problem is that vibrations are transmitted in the direction of the brain, which may cause discomfort to the patient. When vibration energy is released along the load transmission plane, some vibrations are transmitted perpendicular to the upper teeth contact plane, which point toward the forehead region of the brain.

The second problem is that a single U-shaped mouthpiece with three separate load transmission elements inserted inside it causes vibrational interference between the elements. That is, vibrations from one vibration transmission element are felt without much attenuation in other parts of the mouthpiece.

A third issue is that, when used during orthodontic treatment of malocclusions, the dental vibration device must accommodate the changing occlusal situation. For example, the posterior teeth may fail to contact the mouthpiece placed in a patient's mouth in a relaxed state during the early stages of treatment.

Therefore, how to address the aforementioned problems has become an important issue.

BRIEF SUMMARY OF INVENTION

An embodiment of the invention provides a dental vibration device, including a controller, a mouthpiece, and a plurality of transmission elements that include a central transmission element, a left transmission element, and a right transmission element. The controller is housed in a casing. Each transmission element is coupled to a vibration motor. Each transmission element extends from the casing and is inserted into the mouthpiece. The mouthpiece is composed of an anterior teeth part, a left posterior teeth part, and a right posterior teeth part spaced apart from each other.

In some embodiments, the mouthpiece further includes a labial and buccal edge, and the anterior teeth part, the left posterior teeth part and the right posterior teeth part are connected to the labial and buccal edge.

In some embodiments, the mouthpiece further includes a section with a shield that extends from the labial and buccal edge in the anterior direction, and the section with the shield covers the lips to prevent saliva leakage.

In some embodiments, the thickness of the anterior teeth part, the thickness of the left posterior teeth part, and the thickness of the right posterior teeth part in an overall profile view gradually decrease from the anterior end to the posterior end.

In some embodiments, the anterior teeth part of the mouthpiece has an added thickness toward the upper teeth side, wherein when the mouthpiece is placed in the patient's mouth, the patient's upper anterior teeth push downward on the anterior teeth part to tilt the mouthpiece downward in the anterior end.

In some embodiments, each of the left posterior teeth part and the right posterior teeth part has an added thickness toward the lower teeth side, wherein when the mouthpiece is placed in the patient's mouth, the patient's lower posterior teeth push upward on the left posterior teeth part and the right posterior teeth part to tilt the mouthpiece upward in the posterior end.

In some embodiments, the anterior teeth part of the mouthpiece is limited to vibrating in the up-and-down direction, and the left posterior teeth part and the right posterior teeth part of the mouthpiece are limited to vibrating in the left-and-right direction.

In some embodiments, the vibrating direction of the left posterior teeth part is different from the vibrating direction of the right posterior teeth part.

In some embodiments, as observed from the front of the patient, the vibrating direction of the left posterior teeth part and the vibrating direction of the right posterior teeth part form a reverse-V shape.

In some embodiments, the central transmission element is inserted into the anterior teeth part of the mouthpiece and limited to vibrating primarily in the up-and-down direction, the left transmission element is inserted into the left teeth part of the mouthpiece and limited to vibrating primarily in the left-and-right direction, and the right transmission element is inserted into the right teeth part of the mouthpiece and limited to vibrating primarily in the left-and-right direction.

In some embodiments, the dental vibration device further includes a flexible film, enclosing the casing and the mouthpiece.

In some embodiments, the flexible film stretches between the left posterior teeth part and the right posterior teeth part to form a contacting portion, wherein when the patient's tongue contacts the surface of the contacting portion, the tongue is restricted to the side of the contacting portion.

In some embodiments, the flexible film has an opening that allows the flexible film to be pulled away from the dental vibration device after use and be disposed.

In some embodiments, the dental vibration device further includes a flexible film, and the flexible film is connected to the mouthpiece and is located between the left posterior teeth part and the right posterior teeth part.

In some embodiments, the dental vibration device further includes a tightening member, configured to affix the casing to the patient and having a ring portion with a buckle.

In some embodiments, the ring portion is configured to go underneath the bottom of the casing and to go above the patient's ears, and the ring portion surrounds the patient's head.

In some embodiments, the tightening member is elastic, and the ring portion is formed and unlocked by the buckle.

In some embodiments, the dental vibration device further includes a flexible film that encloses the casing and the mouthpiece, and the tightening member surrounds the flexible film to affix the flexible film to the casing.

In some embodiments, the mouthpiece further includes a plurality of anti-slip strips protruding from the upper surfaces of the left posterior teeth part and the right posterior teeth part.

In some embodiments, the upper surface of the anterior teeth part is substantially parallel to lower surfaces of the left posterior teeth part and the right posterior teeth part.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the dental vibration device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
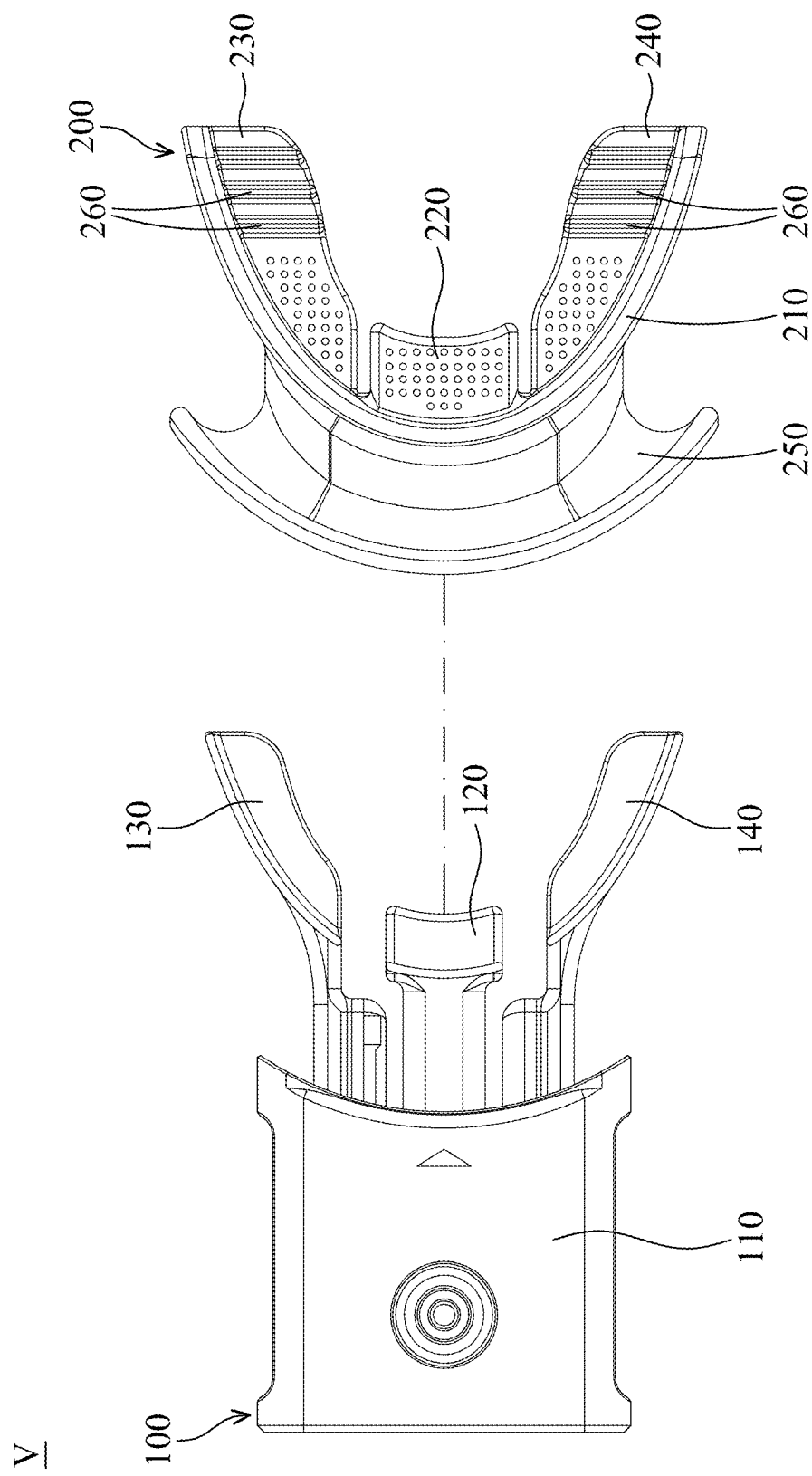
FIG. 1 is an exploded-view diagram of a dental vibration device according to an embodiment of the invention.
Figure 2:
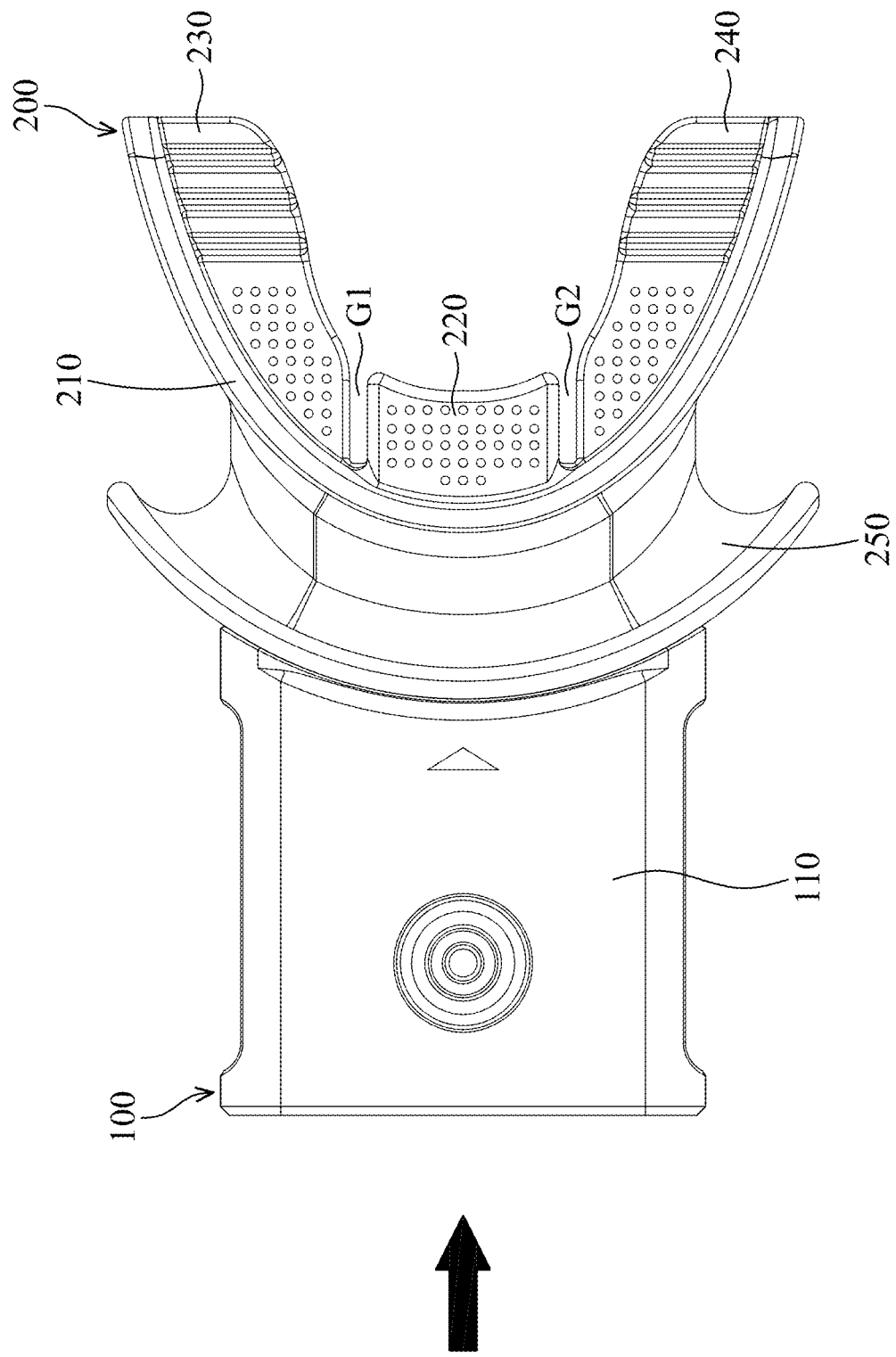
FIG. 2 is a schematic diagram of the dental vibration device according to an embodiment of the invention.

Referring to FIG. 1 and FIG. 2, in an embodiment of the invention, a dental vibration device V includes a vibrator 100 and a mouthpiece 200. When the patient uses the dental vibration device V, the vibrator 100 can be inserted into the mouthpiece 200 and the mouthpiece 200 can be placed in the patient's mouth. During the vibration of the vibrator 100, the chewing habits of the patient with an abnormal pattern developed over time can be treated or adjusted.

Figure 3:
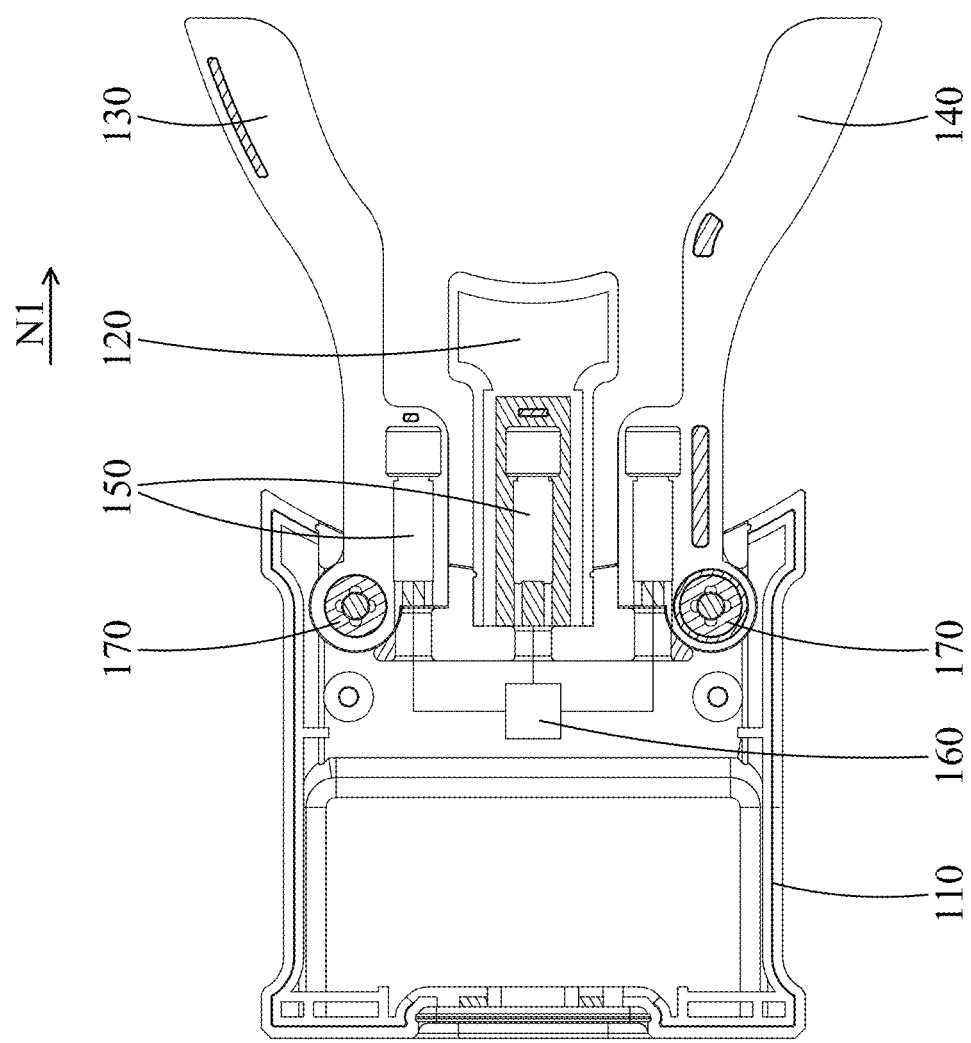
FIG. 3 is a cross-sectional view of a vibrator according to an embodiment of the invention.

As shown in FIG. 1 to FIG. 3, the vibrator 100 primarily includes a casing 110, a central transmission element 120, a left transmission element 130, a right transmission element 140, a plurality of vibration motors 150, and a controller 160. The central transmission element 120, the left transmission element 130, and the right transmission element 140 are connected to the casing 110, and extend from the casing 110 in the posterior direction N1. The central transmission element 120, the left transmission element 130, and the right transmission element 140 respectively correspond to the patient's anterior teeth, left posterior teeth, and right posterior teeth. Thus, the central transmission element 120 is disposed between the left transmission element 130 and the right transmission element 140, and the extending length of the central transmission element 120 is less than that of the left transmission element 130 and the right transmission element 140. In this embodiment, the extending length of the left transmission element 130 is substantially the same as that of the right transmission element 140, but it is not limited thereto.

Each transmission element is coupled to one of vibration motors 150, so that the vibration energy from the vibration motors 150 can be transferred to the central transmission element 120, the left transmission element 130 and the right transmission element 140. In this embodiment, the vibration motors 150 are located in the extraoral sections of the central transmission element 120, the left transmission element 130 and the right transmission element 140.

The controller 160 is housed in the casing 110, and is electrically connected to the vibration motors 150. The controller 160 is configured to transmit signal to the vibration motors 150 to actuate or stop the vibration motors 150. In other words, each vibration motors 150 can be actuated separately by the controller 150, and the vibration energy from the vibration motors 150 is transmitted along the transmission elements to the intraoral sections of the central transmission element 120, the left transmission element 130 and the right transmission element 140.

Figure 4:
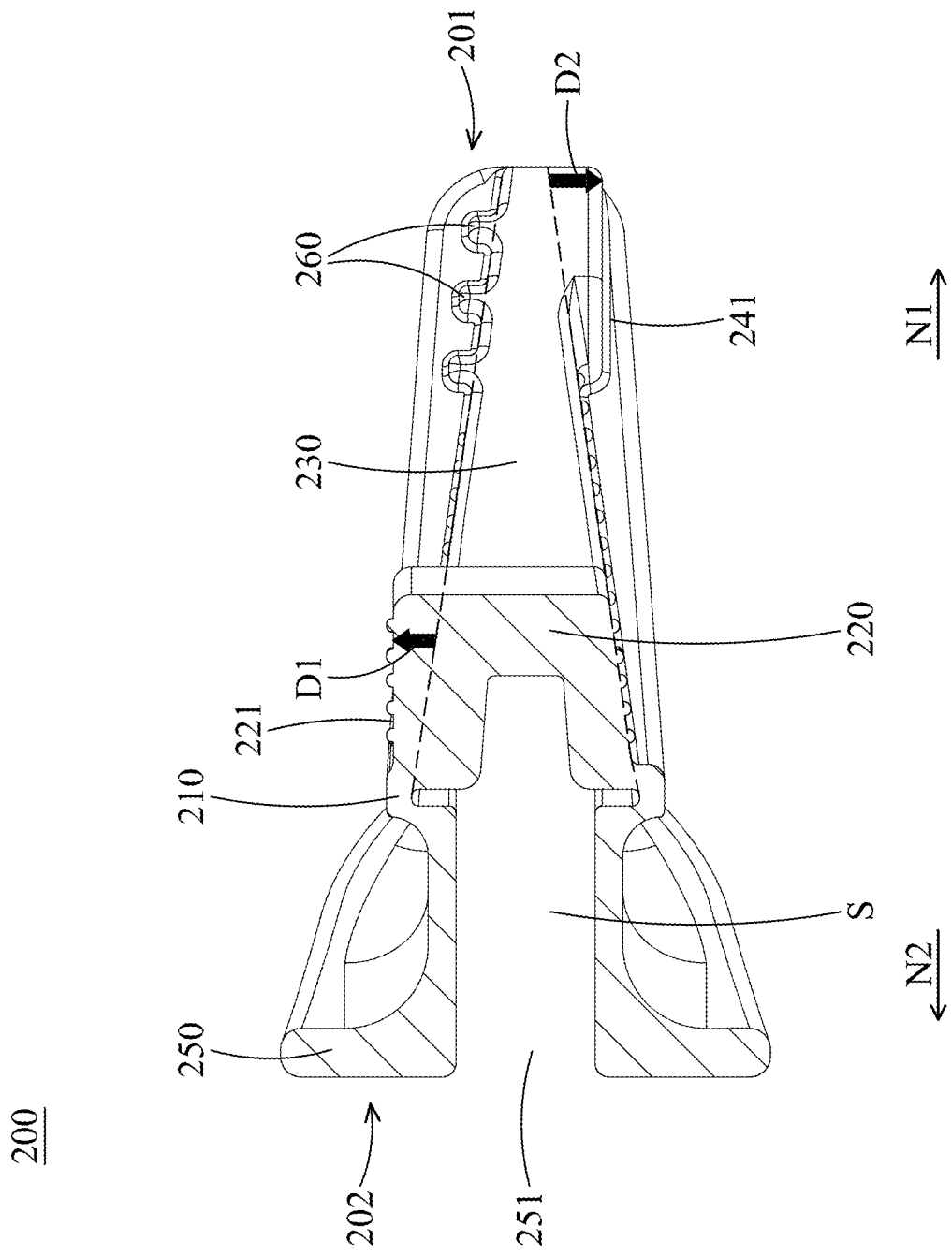
FIG. 4 is a cross-sectional view of a mouthpiece according to an embodiment of the invention.

As shown in FIGS. 1-2 and 4, the mouthpiece 200 primarily includes a labial and buccal edge 210, an anterior teeth part 220, a left posterior teeth part 230, a right posterior teeth part 240, and a section with a shield 250. The right posterior teeth part 240, the anterior teeth part 220, and the left posterior teeth part 230 are connected to the labial and buccal edge 210 and extend in the posterior direction N1, and the section with the shield 250 is connected to the labial and buccal edge 210 and extends in the anterior direction N2. The mouthpiece 200 has an internal space S extending throughout the labial and buccal edge 210, the anterior teeth part 220, the left posterior teeth part 230, the right posterior teeth part 240, and the section with the shield 250. An opening 251 that exposes the internal space S to the external environment is formed on the section with the shield 250. Therefore, the central transmission element 120, the left transmission element 130, and the right transmission element 140 of the vibrator 100 can be inserted into the internal space S via the opening 251. In particular, the central transmission element 120, the left transmission element 130, and the right transmission element 140 are configured to be inserted into the anterior teeth part 220, the left posterior teeth part 230, and the right posterior teeth part 240 of the mouthpiece 200, respectively. In this embodiment, the mouthpiece 200 is made of an elastic material that is suitable for intraoral dental use, such as silicone, but it is not limited thereto.

It should be noted that, in this embodiment, the anterior teeth part 220, the left posterior teeth part 230, and the right posterior teeth part 240 are spaced apart from each other (in other words, there is a gap G1 between the anterior teeth part 220 and the left posterior teeth part 230, and there is a gap G2 between the anterior teeth part 220 and the right posterior teeth part 240). This spaced-apart configuration can reduce the amount of interference from vibration, and the vibration energy can be more efficiently transferred to the anterior teeth, the left posterior teeth, and the right posterior teeth respectively from the anterior teeth part 220, the left posterior teeth part 230, and the right posterior teeth part 240.

The thickness of the anterior teeth part 220, the thickness of the left posterior teeth part 230, and the thickness of the right posterior teeth part 240 in an overall profile view gradually decrease from the anterior end 202 to the posterior end 201 (for example, as indicated by the dotted line in FIG. 4). Accordingly, when the mouthpiece 200 is placed in the mouth of the patient, the anterior teeth part 220, the left posterior teeth part 230, and the right posterior teeth part 240 act as props to keep the jaw open. This allows the patient to rest the jaw muscles while maintaining the mouthpiece 200 in the mouth and the jaw open in this position.

In this embodiment, the anterior teeth part 220 further has an added thickness D1 toward the upper teeth side, and the left posterior teeth part 230 and the right posterior teeth part 240 have an added thickness D2 toward the lower teeth side. In other words, the anterior teeth part 220 has a portion that protrudes upwardly from the upper gradually decreasing dotted line in FIG. 4, and each of the left posterior teeth part 230 and the right posterior teeth part 240 has a portion that protrudes downwardly from the lower gradually decreasing dotted line in FIG. 4.

Figure 5:
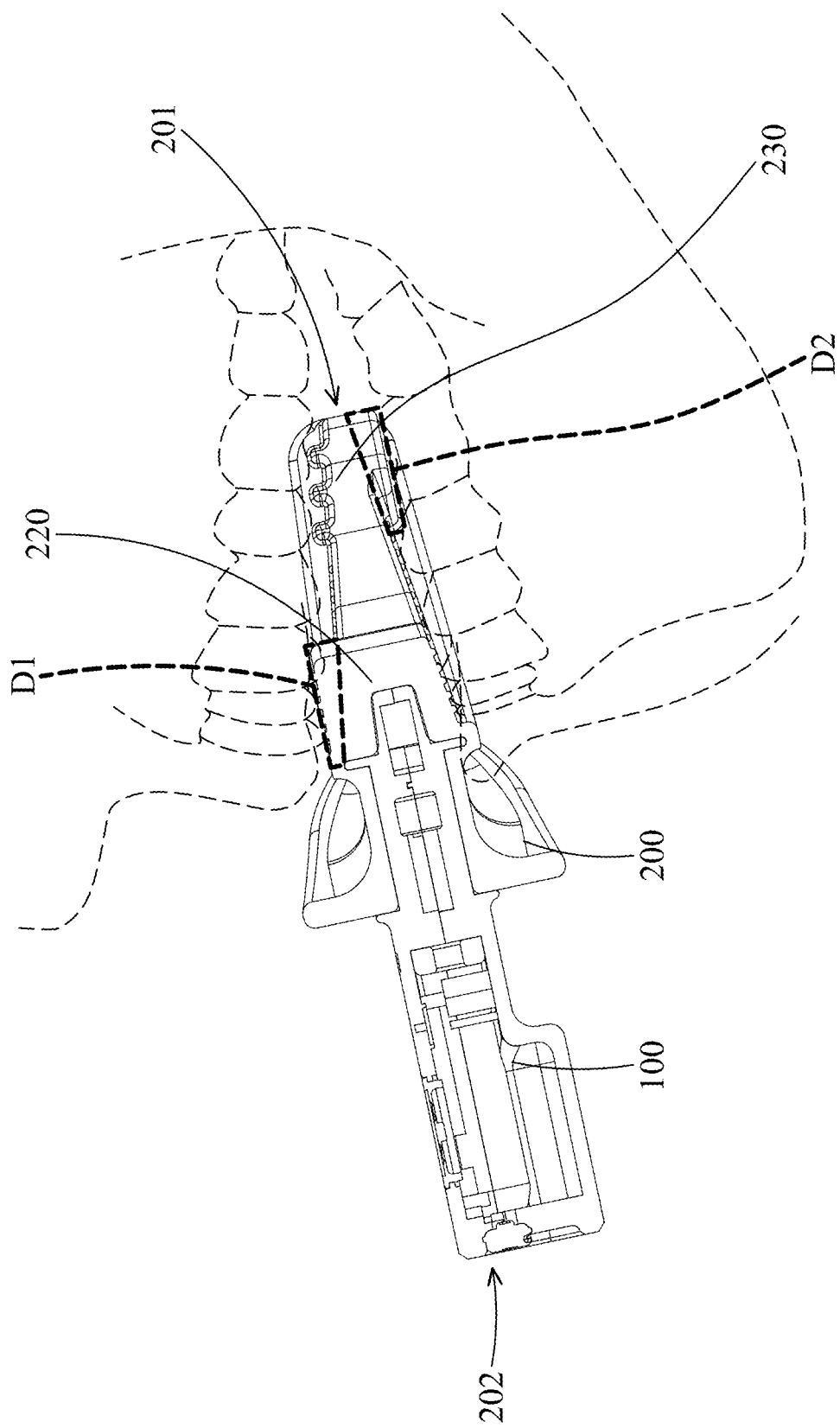
FIG. 5 is a schematic view illustrating a patient wearing the dental vibration device of FIGS. 1-4.

As shown in FIG. 5, owing to the aforementioned added thickness D1, when the mouthpiece 200 is placed in the patient's mouth, the patient's upper anterior teeth will push downward on the anterior teeth part 220 to tilt the mouthpiece 200 downward in the anterior end 202. Also, owing to the aforementioned added thickness D2, when the mouthpiece 200 is placed in the patient's mouth, the patient's lower posterior teeth will push upward on the left posterior teeth part 230 and the right posterior teeth part 240 to tilt the mouthpiece 200 upward in the posterior end 201. Therefore, the vibration energy can be directed toward the nose tip instead of toward the brain, and the patient's discomfort can be prevented. Moreover, it can also prevent situations in which the posterior teeth fail to contact the mouthpiece placed in a patient's mouth in a relaxed state during the early stages of treatment. The dental vibration device V is able to accommodate the changing occlusion during the orthodontic treatments by making the mouthpiece 200 tilt downward at the anterior end 202 when placed in the patient's mouth.

In some embodiments, the mouthpiece 200 only has the added thickness D1 in the anterior teeth part 220, and the left posterior teeth part 230 and the right posterior teeth part 240 do not include added thickness. In some embodiments, the mouthpiece 200 only has the added thickness D2 in the left posterior teeth part 230 and the right posterior teeth part 240, and the anterior teeth part 220 does not include any added thickness.

As shown in FIG. 4, the upper surface 221 of the anterior teeth part 220 can be substantially parallel to the lower surface 231 of the left posterior teeth part 230 and the lower surface 241 of the right posterior teeth part 240, so as to facilitate the occlusion of the patient.

Moreover, the mouthpiece 200 can further include a plurality of anti-slip strips 260 connected to the left posterior teeth part 230 and the right posterior teeth part 240 and protruding from their upper surfaces 232 and 242. The anti-slip strips 260 can also facilitate the occlusion of the patient.

The section with the shield 250 is connected to the labial and buccal edge 210, and it extends in the anterior direction N2. The anterior direction N2 is opposite to the posterior direction N1. When the mouthpiece 200 is placed in the patient's mouth, the section with the shield 250 can cover the face around the lips to prevent saliva from leaking out.

Figure 6:
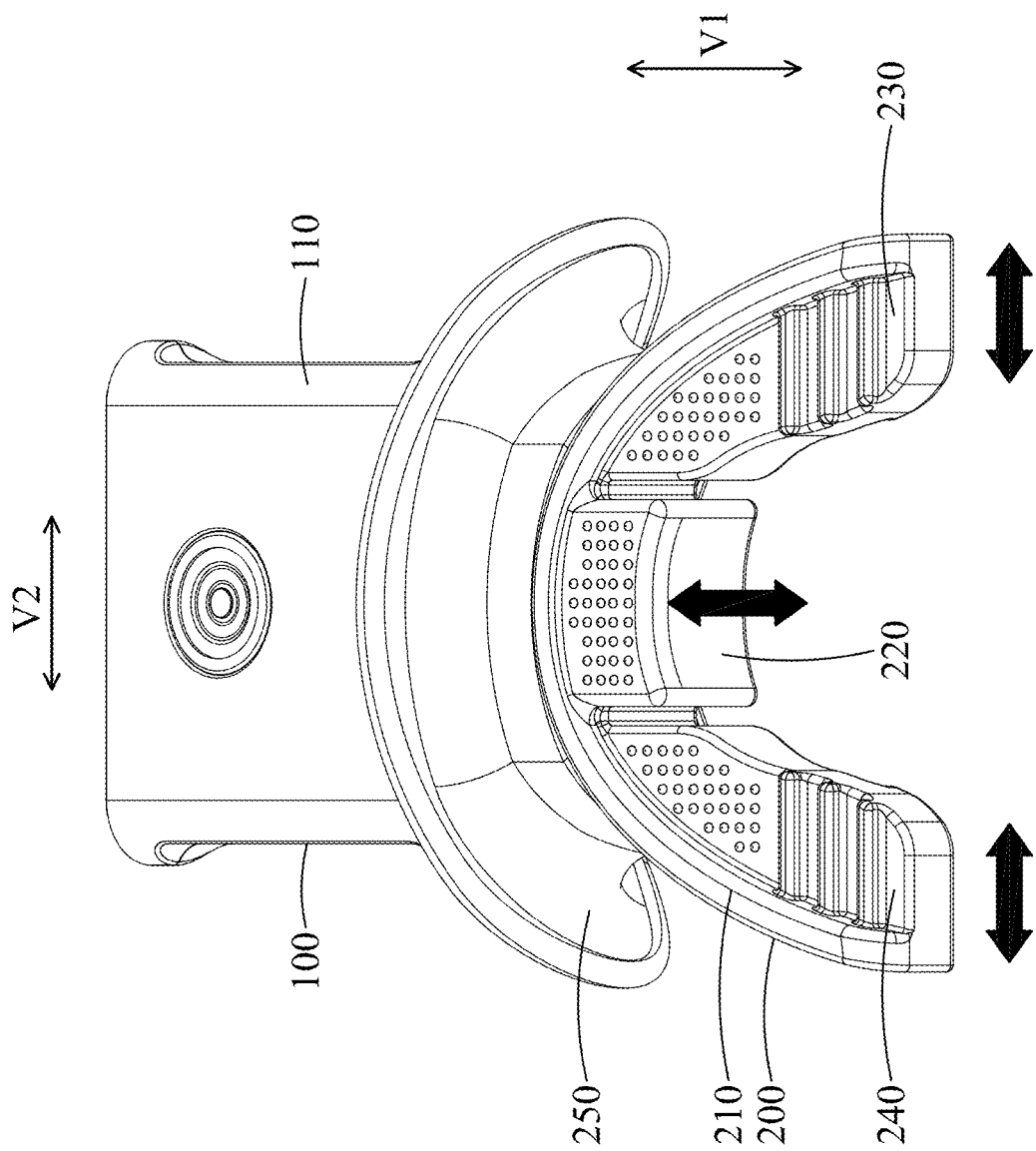
FIG. 6 is a schematic diagram of vibrating directions of the anterior teeth part, the left posterior teeth part, and the right posterior teeth part according to an embodiment of the invention.

Referring to FIG. 6, in this embodiment, the anterior teeth part 220 of the mouthpiece 200 is limited to vibrating primarily in the up-and-down direction V1, and the left posterior teeth part 230 and the right posterior teeth part 240 of the mouthpiece 200 are limited to vibrating primarily in the left-and-right direction V2. Accordingly, the chewing habits of the patient with an abnormal pattern can be efficiently treated or adjusted.

For example, as shown in FIG. 3, the vibrator 100 can further include a plurality of hinges 170. The hinges 170 can reduce the freedom of movement of the left transmission element 130 and the right transmission element 140 in the up-and-down direction V1, and to allow more movement for the left transmission element 130 and the right transmission element 140 in the left-and-right direction V2. The vibration motor 150 corresponding to the central transmission element 120 can be bonded to the casing 110, so as to allow more movement for the central transmission element 120 in the up-and-down direction V1.

Figure 7:
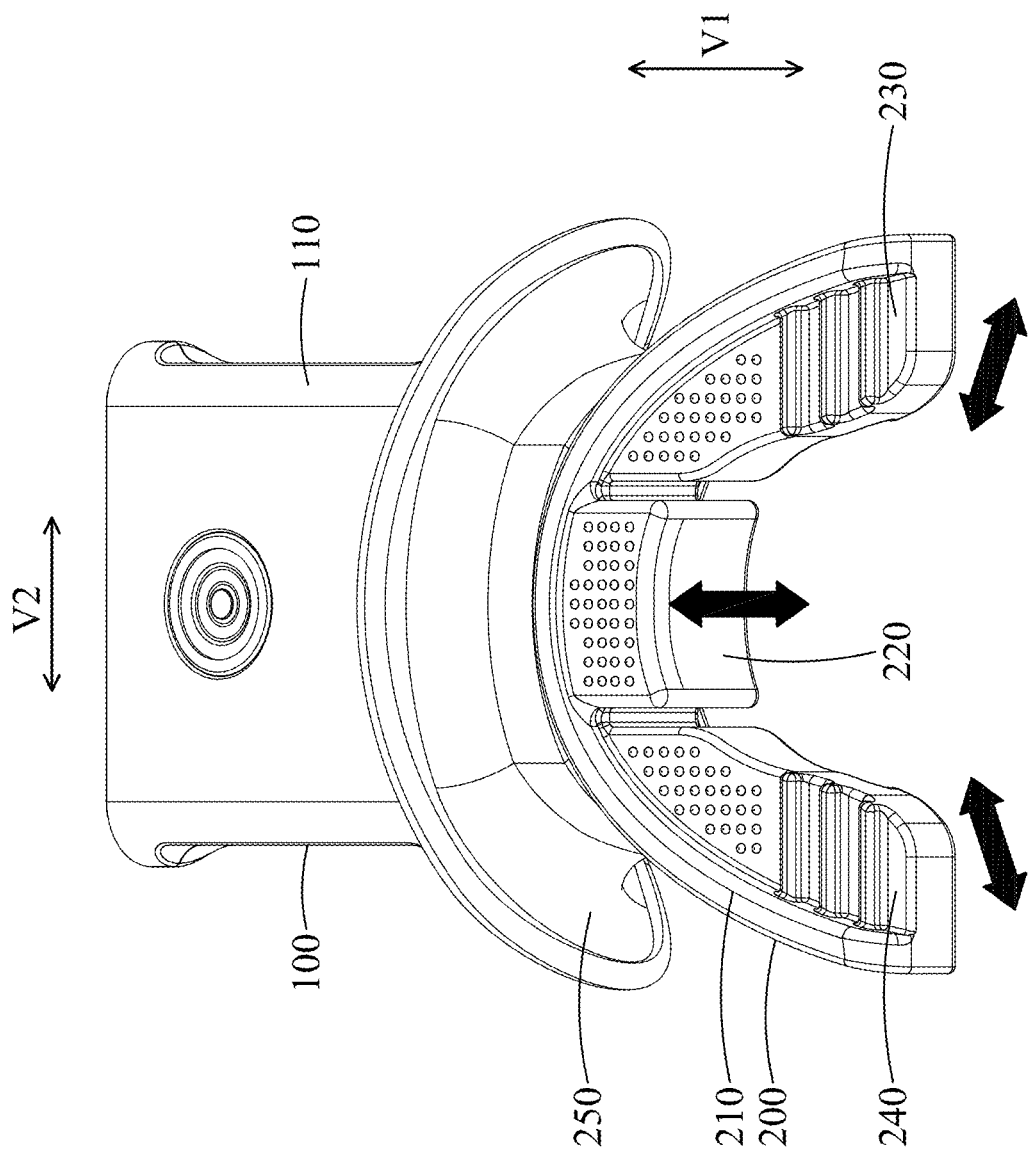
FIG. 7 is a schematic diagram of vibrating directions of the anterior teeth part, the left posterior teeth part, and the right posterior teeth part according to another embodiment of the invention.

As shown in FIG. 7, in another embodiment of the invention, the anterior teeth part 220 of the mouthpiece 200 is limited to vibrating primarily in the up-and-down direction V1, the left posterior teeth part 230 and the right posterior teeth part 240 of the mouthpiece 200 are limited to vibrating primarily in the left-and-right direction V2, and the vibrating direction of the left posterior teeth part 230 is different from the vibrating direction of the right posterior teeth part 240. As observed from the front of the patient, the vibrating direction of the left posterior teeth part 230 and the vibrating direction of the right posterior teeth part 240 can form a reverse-V shape. This vibrating configuration is closer to the chewing movements of a normal human, so that the chewing habits of the patient with an abnormal pattern can be treated or adjusted more efficiently.

In some embodiments, the vibration motor 150 in the central transmission element 120 can only vibrate primarily in the up-and-down direction V1, and the vibration motors 150 in the left transmission element 130 and the right transmission element 140 can only vibrate primarily in the left-and-right direction V2.

Figure 8:
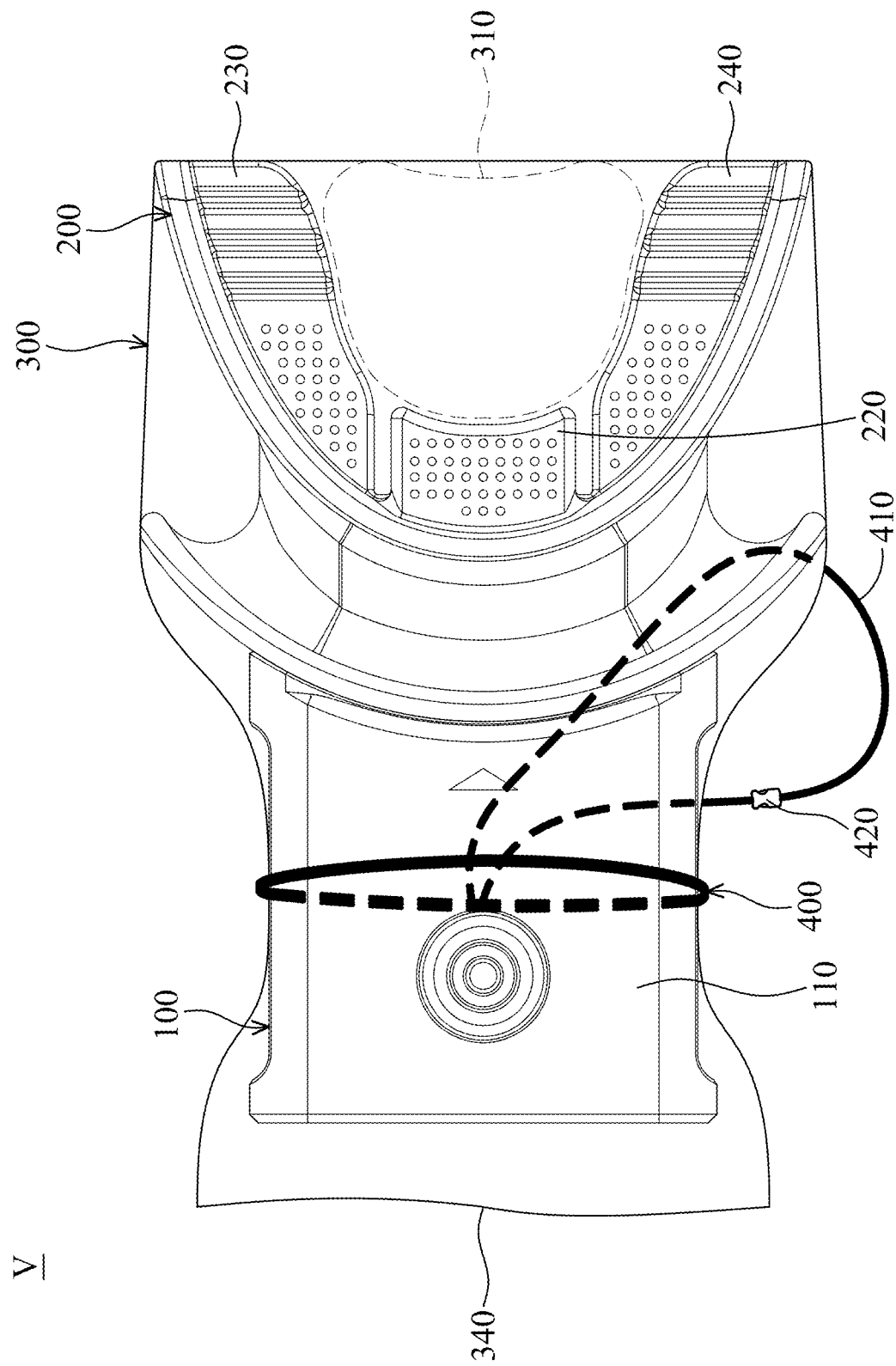
FIG. 8 is a schematic diagram of a dental vibration device according to another embodiment of the invention.

Referring to FIG. 8, in another embodiment of the invention, a dental vibration device V includes a vibrator 100, a mouthpiece 200, a flexible film 300, and a tightening member 400. The structures of the vibrator 100 and the mouthpiece 200 are the same as that in the embodiment of FIGS. 1-7, so that the features thereof are not repeated in the interest of brevity.

The flexible film 300 encloses the vibrator 100 and the mouthpiece 200 that are coupled to each other, and a portion of the flexible film 300 between the left posterior teeth part 230 and the right posterior teeth part 240 of the mouthpiece 200 can be defined as a contacting portion 310. The tightening member 400 is affixed to the casing 110 and has a ring portion 410 with a buckle 420.

Figure 9:
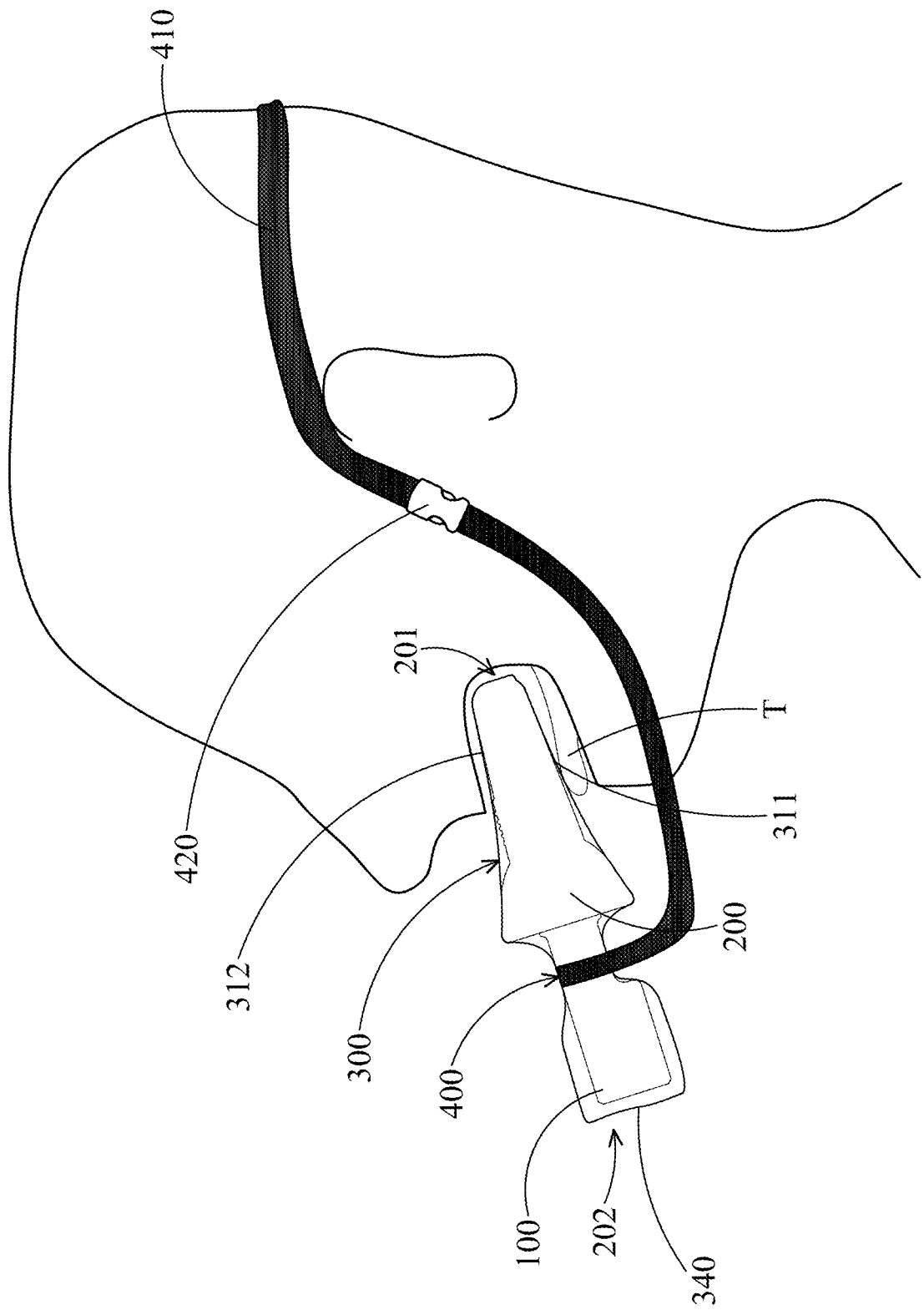
FIG. 9 is a schematic view illustrating a patient wearing the dental vibration device of FIG. 8.

As shown in FIG. 9, when the improved dental vibration device V is in use, the mouthpiece 200 can be placed in the patient's mouth, and the ring portion 410 of the tightening member 400 goes under the bottom side of the casing 110 to surround the patient's head, wherein at least a part of the ring portion 410 is disposed above the patient's ears (i.e. between the patient's ears and the top of the head). Therefore, the mouthpiece 200 can be tilted in the anterior end 202, and the vibration energy directed to the brain can be reduced.

The tightening member 400 can be made by elastic material, and the ring portion 410 can be formed or unlocked by the buckle 420. Therefore, the tightening member 400 can be adapted to various dimensions of the patient's head, and the assembly of the tightening member 400 can be facilitated.

Still in FIG. 9, when the dental vibration device V is in use, the patient's tongue T is in contact with the lower surface 311 or the upper surface 312 of the flexible film 300 in the contacting portion 310. Since the position of the patient's tongue T is restricted, the respiratory tract from the nasopharynx through the oropharynx to the laryngopharynx is not blocked by the palatine uvula, and the snoring problem can be prevented.

The flexible film 300 can be made by polyethylene (PE), for example. In this embodiment, the flexible film 300 can include an opening 340, and the flexible film 300 and the tightening member 400 can be disposable. After the patient uses the dental vibration device V, the tightening member 400 can be detached, and the vibrator 100 and the mouthpiece 200 can be pulled out from the opening 340. Subsequently, the flexible film 300 can be disposed (trashed). Since the vibrator 100 and the mouthpiece 200 are not directly in contact with the patient's mouth, the cleaning process can be avoided.

Figure 10:
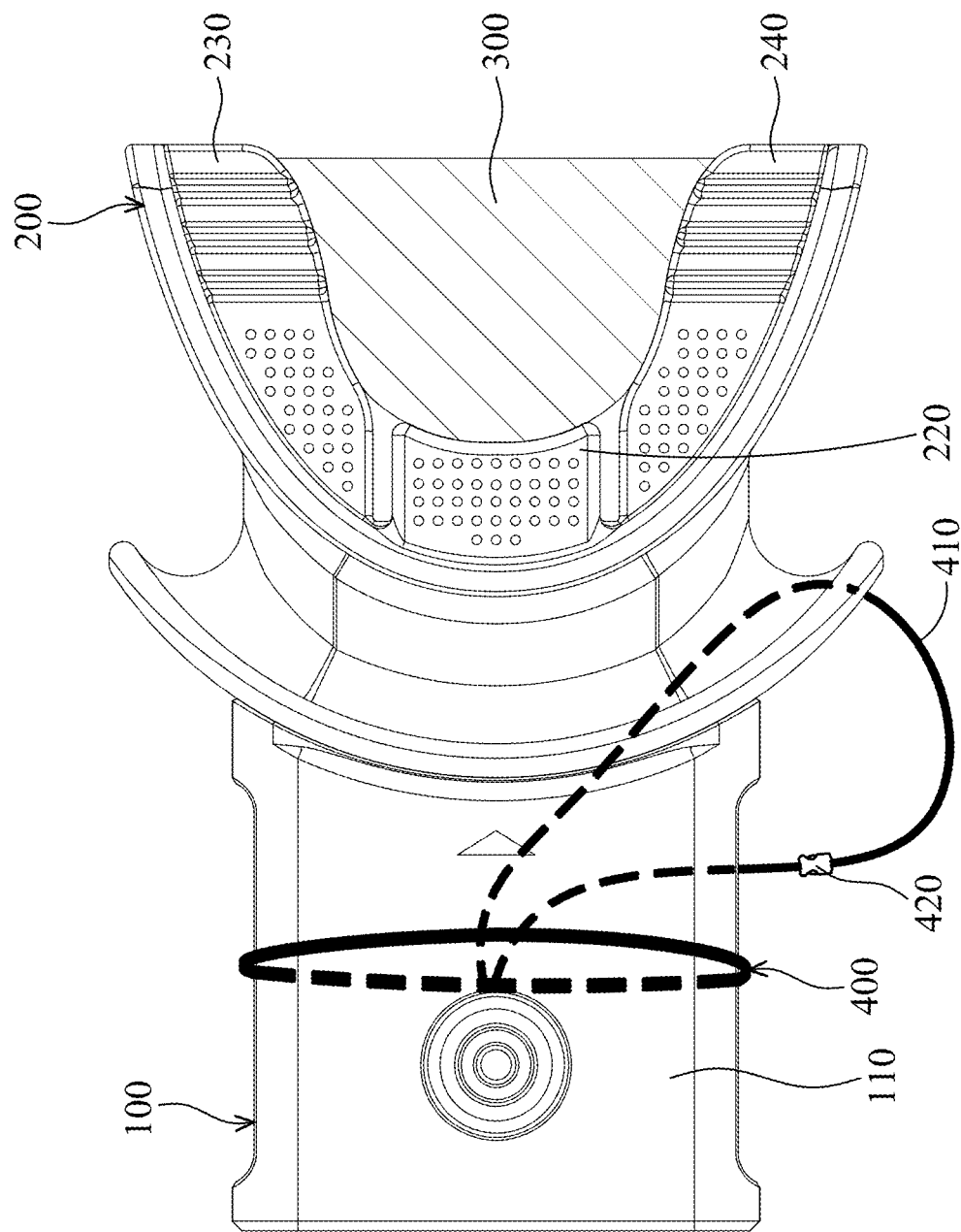
FIG. 10 is a schematic diagram of a dental vibration device according to another embodiment of the invention.

As shown in FIG. 10, in another embodiment of the invention, the dental vibration device V includes a vibrator 100, a mouthpiece 200, a flexible film 300, and a tightening member 400, wherein the structures of the vibrator 100, the mouthpiece 200 and the tightening member 400 are the same as that in the embodiment of FIG. 8 and FIG. 9, so that the features thereof are not repeated in the interest of brevity. In this embodiment, the flexible film 300 is directly affixed to the mouthpiece 200 and disposed between the left posterior teeth part 230 and the right posterior teeth part 240 of the mouthpiece 200, and the patient's teeth can be directly in contact with the mouthpiece 200 to receive the vibration.

In summary, an embodiment of the invention provides a dental vibration device, including a controller, a mouthpiece, and a plurality of transmission elements that include a central transmission element, a left transmission element, and a right transmission element. The controller is housed in a casing. Each transmission element is coupled to a vibration motor. Each transmission element extends from the casing and is inserted into the mouthpiece. The mouthpiece is composed of an anterior teeth part, a left posterior teeth part, and a right posterior teeth part spaced apart from each other.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure.

Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A dental vibration device, comprising:
a controller, housed in a casing;
a mouthpiece; and
a plurality of transmission elements, comprising a central transmission element, a left transmission element, and a right transmission element,
wherein each transmission element is coupled to a vibration motor, extending from the casing, and is inserted into the mouthpiece,
wherein the mouthpiece is composed of an anterior teeth part, a left posterior teeth part, and a right posterior teeth part spaced apart from each other.

2. The dental vibration device as claimed in claim 1, wherein the mouthpiece further comprises a labial and buccal edge, and the anterior teeth part, the left posterior teeth part and the right posterior teeth part are connected to the labial and buccal edge.

3. The dental vibration device as claimed in claim 2, wherein the mouthpiece further comprises a section with a shield that extends from the labial and buccal edge in an anterior direction, and the section with the shield can cover the lips to prevent saliva leakage.

4. The dental vibration device as claimed in claim 1, wherein a thickness of the anterior teeth part, a thickness of the left posterior teeth part, and a thickness of the right posterior teeth part in an overall profile view gradually decrease from an anterior end to a posterior end.

5. The dental vibration device as claimed in claim 1, wherein the anterior teeth part of the mouthpiece has an added thickness toward an upper teeth side, wherein when the mouthpiece is placed in a patient's mouth, upper anterior teeth of the patient push downward on the anterior teeth part to tilt the mouthpiece downward in an anterior end.

6. The dental vibration device as claimed in claim 1, wherein each of the left posterior teeth part and the right posterior teeth part has an added thickness toward a lower teeth side, wherein when the mouthpiece is placed in a patient's mouth, lower posterior teeth of the patient push upward on the left posterior teeth part and the right posterior teeth part to tilt the mouthpiece upward in a posterior end.

7. The dental vibration device as claimed in claim 1, wherein the anterior teeth part of the mouthpiece is limited to vibrating primarily in an up-and-down direction, and the left posterior teeth part and the right posterior teeth part of the mouthpiece are limited to vibrating primarily in a left-and-right direction.

8. The dental vibration device as claimed in claim 7, wherein a vibrating direction of the left posterior teeth part is different from a vibrating direction of the right posterior teeth part.

9. The dental vibration device as claimed in claim 8, wherein as observed from front of a patient, the vibrating direction of the left posterior teeth part and the vibrating direction of the right posterior teeth part form a reverse-V shape.

10. The dental vibration device as claimed in claim 1, wherein the central transmission element is inserted into the anterior teeth part of the mouthpiece and limited to vibrating primarily in an up-and-down direction, the left transmission element is inserted into the left posterior teeth part of the mouthpiece and limited to vibrating primarily in a left-and-right direction, and the right transmission element is inserted into the right posterior teeth part of the mouthpiece and limited to vibrating primarily in the left-and-right direction.

11. The dental vibration device as claimed in claim 1, wherein the dental vibration device further comprises a flexible film, enclosing the casing and the mouthpiece.

12. The dental vibration device as claimed in claim 11, wherein the flexible film stretches between the left posterior teeth part and the right posterior teeth part to form a contacting portion, wherein when a tongue of a patient contacts a surface of the contacting portion, the tongue is restricted to a side of the contacting portion.

13. The dental vibration device as claimed in claim 11, wherein the flexible film has an opening that allows the flexible film to be pulled away from the dental vibration device after use and be disposed.

14. The dental vibration device as claimed in claim 1, wherein the dental vibration device further comprises a flexible film, and the flexible film is connected to the mouthpiece and is located between the left posterior teeth part and the right posterior teeth part.

15. The dental vibration device as claimed in claim 1, wherein the dental vibration device further comprises a tightening member, configured to affix the casing to a patient and having a ring portion with a buckle.

16. The dental vibration device as claimed in claim 15, wherein the ring portion is configured to go underneath a bottom of the casing and to go above the patient's ears, and the ring portion surrounds the patient's head.

17. The dental vibration device as claimed in claim 15, wherein the tightening member is elastic, and the ring portion is formed and unlocked by the buckle.

18. The dental vibration device as claimed in claim 15, wherein the dental vibration device further comprises a flexible film that encloses the casing and the mouthpiece, and the tightening member surrounds the flexible film to affix the flexible film to the casing.

19. The dental vibration device as claimed in claim 1, wherein the mouthpiece further comprises a plurality of anti-slip strips protruding from upper surfaces of the left posterior teeth part and the right posterior teeth part.

20. The dental vibration device as claimed in claim 1, wherein an upper surface of the anterior teeth part is substantially parallel to lower surfaces of the left posterior teeth part and the right posterior teeth part.

* * * * *